Sept. 29, 1942.	G. D. BEAL	2,296,974
METHOD OF STERILIZING CONTAINERS
Filed May 13, 1940
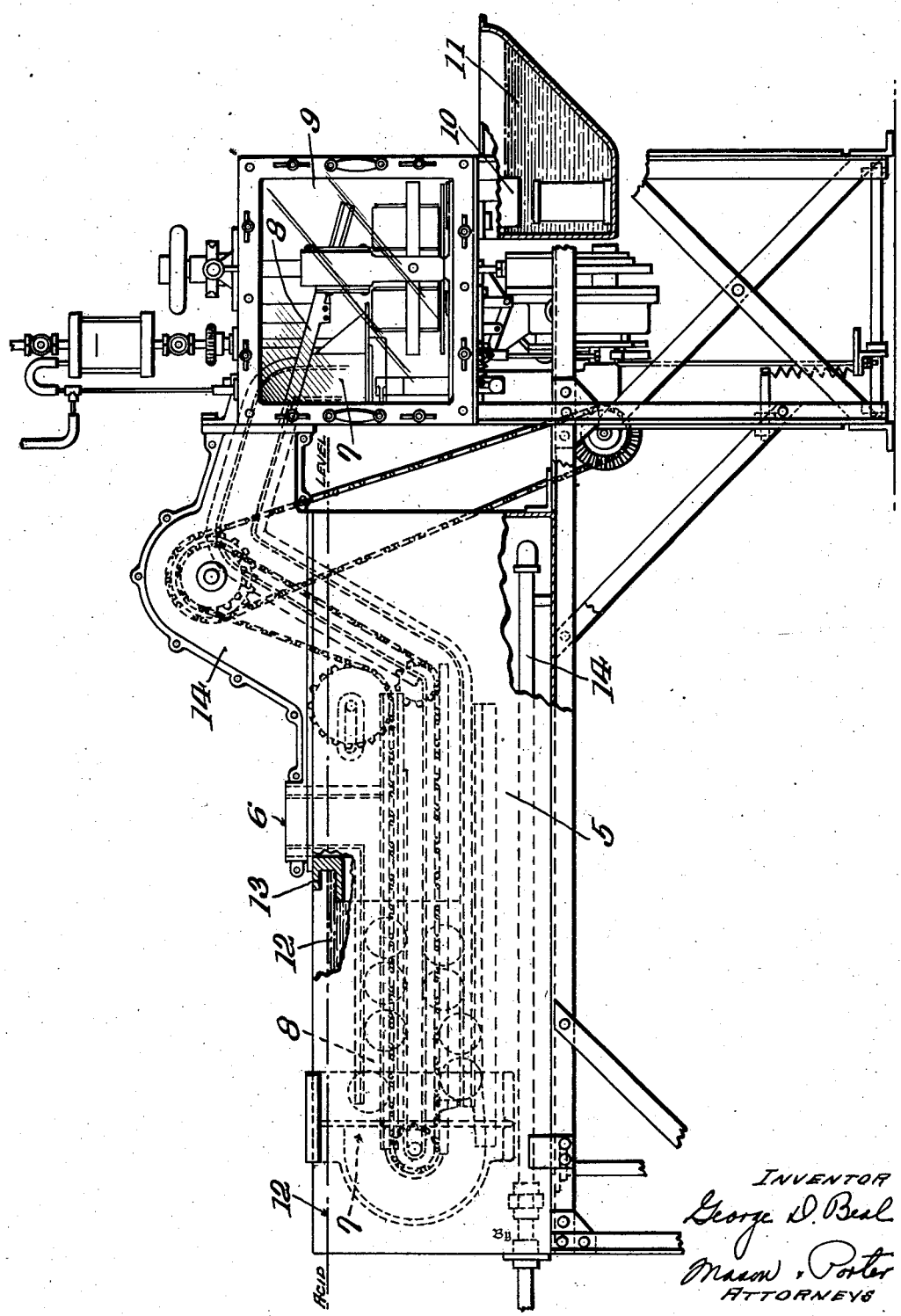
INVENTOR
George D. Beal
Mason + Porter
ATTORNEYS Patented Sept. 29, 1942

2,296,974

UNITED STATES PATENT OFFICE 2,296,974

METHOD OF STERILIZING CONTAINERS

George D. Beal, Pittsburgh, Pa., assignor to Continental Can Company, Inc., New York, N. Y., a corporation of New York Application May 13, 1940, Serial No. 334,929

3 Claims. (Cl. 99—182)

The invention relates generally to the art of packaging foods and beverages, and primarily seeks to provide a novel container sterilizing bath and a novel method of sterilizing containers in a manner for avoiding damage by heat application to the containers or protective coatings thereon prior to the filling and sealing of foods or beverages therein, or to the containers or coatings and the foods or beverages therein subsequent to sealing of the containers, or during the customary heat-processing operation.

It has been quite common to utilize dry heat or superheated steam in sterilizing containers prior to the packaging of foods and beverages therein, and this heat application has been found objectionable because some containers are equipped with protective and decorative coatings which are only indifferently resistant to such heat application. Moreover, this heretofore necessary application of heat has rendered impractical the use of containers formed of plastics subject to deformation at these high sterilizing and processing temperatures.

It has also been common practice in the past to seal beverages including fruit or vegetable juices, beer, wine and foodstuffs in containers of metal or glass and afterwards to heat the sealed containers in a bath or spray of water, or by other means, until sterilization is effected. Even though the product be sterile at the time it is placed in the container, the infection on the inner wall of the container will be distributed throughout the contents during and after the act of filling, so that it will be necessary to bring the entire contents of the containers to the sterilizing temperature and hold it at that point for an adequate length of time. By the time proper heat penetration has been secured, the portion of the contents adjacent to the wall of the container will have become overheated and thereby subjected to flavor change by heat, even though the container be rotated or otherwise kept in motion to agitate the contents. It is the purpose of the present invention to remedy these conditions.

It is therefore an object of the invention to provide a novel bath for, and a method of, sterilizing containers in which foods and beverages are to be packaged, and more particularly containers for food products and beverages which are themselves sterile and which when sealed in sterile containers will not require subsequent heat processing operations, said bath and method serving to accomplish the desired sterilizing function efficiently and without objectionable heat application.

Another object of the invention is to provide a novel method of sterilizing containers having a protective or decorative coating material applied thereto, wherein an aqueous sterilizing medium is caused to contact with all parts of the container, which sterilizing medium is maintained at a temperature sufficiently low as to avoid any injurious effects upon the coating material.

A further object of the invention is to provide a novel method of sterilizing containers wherein the container is rendered sterile while passing through an aqueous sterilizing bath into a sterile atmosphere in which the container is to be filled, said bath serving at least in part to seal or trap said atmosphere.

A further object of the invention is to provide a method of the character stated in which the sterilizing agent employed is a constituent of the food or beverage which is to be packaged in the container.

A still further object of the invention is to provide a novel method of sterilizing containers for orange or other citrus fruit juices wherein the containers are immersed in an aqueous solution of citric acid having a pH of approximately 3.0 or less at a temperature of 180° F.

With the above and other objects in view that will hereinafter appear, the nature of the invention will be more fully understood by following the detailed description, the appended claims, and the illustration in the accompanying drawing.

In the drawing there is illustrated, in a single side view in which parts are broken away, an apparatus in which the herein-described method can be practiced.

In the example of embodiment of the invention herein disclosed, pre-sterilization of containers for the hermetic packaging of fruit juices is stressed, particularly orange juice and other juices from the citrus family, but it is to be understood that the invention is not limited to the treatment of containers for such juices alone but contemplate the practicing of the novel method in the packaging of other juices and food stuffs.

The product to be packaged in the container may be sterile de novo by virtue of having had no contact with viable contaminating organisms during the process of extraction or preparation, or it may have been rendered sterile after its preparation. Those skilled in the art will be familiar with methods for the flash pasteurization of liquids, whereby they are heated in film form or in volumes of very narrow cross section to a sterilizing temperature under a very rapid increment of heat and while in motion and as rapidly cooled thereafter, whereby the infecting organisms reach their thermal death point before the time of heating can produce an unfavorable flavor change. And those persons will also be familiar with methods of sterilization by filtration, whereby a filter medium of such character and fineness is used that all microorganisms will be removed from a fluid passed through the filter. Because of the availability of these methods of sterilization as well as the ability to prepare products that are sterile de novo it is increasingly important to have efficient methods for the pre-sterilization of containers, and because of requirements for speed and because of the susceptibility of some of the most desirable and flavor free lining compounds to higher temperatures in conjunction with moisture to accomplish this sterilization at the lowest possible temperature and in the least time. It is also imperative that the container, so sterilized, shall contribute no foreign substance to the contents to be placed therein.

My invention takes advantage of the fact that the heat resistance of bacteria, yeasts, and molds increases with an increase in the pH of the substrate up to the point of approximate neutrality, and thereafter decreases with a further increase in pH. Thus by immersing my container in an aqueous solution that is definitely acid or alkaline in character and maintained at a predetermined temperature it is sterilized rapidly and completely. Furthermore, because the infection resides upon the surface of the container, which surface is in intimate contact with the water, since the equipment may be so designed that the container fills with the liquid, transfer of heat from the liquid to the constructional material of the container proceeds first through the infected surface.

The average pH of the juices of the common fruits and the acid characteristics of each is shown below as follows:

| Fruit | pH | Principal acid |
|---|---|---|
| Grape | 4.0 | Tartaric |
| Pear | 3.8 | Malic |
| Cherry | 3.6 | Malic |
| Orange | 3.5 | Citric |
| Peach | 3.5 | Malic |
| Raspberry | 3.4 | Malic |
| Blackberry | 3.4 | Malic |
| Strawberry | 3.3 | Malic |
| Grapefruit | 3.2 | Citric |
| Gooseberry | 3.0 | Malic |
| Apple | 3.0 | Malic |
| Currant | 2.9 | Malic |
| Plum | 2.9 | Malic |
| Lemon | 2.3 | Citric |
| Lime | 2.0 | Citric |

A container intended to receive any one of the above juices, may, with its closure, be placed in an aqueous solution of the appropriate acid having a pH approximating that of the juice, and maintained at a temperature of approximately 180° F. for a period of from two to four minutes with the assurance that the container and closure will be rendered free from spoilage organisms during this time. In fact, at the pH of the orange juice, perfect sterility has been obtained in thirty seconds at 180° F.

In U. S. Letters-Patent 2,047,935, issued on July 21, 1936, to George D. Beal and Ronald B. McKinnis, there is disclosed a method wherein the sterile juice of externally sterilized oranges is extracted out of contact with air or infecting organisms in an inert atmosphere of carbon dioxide or nitrogen and is sealed in sterile containers in a similarly inert atmosphere, and is thereby protected against oxidation and microbiological spoilage. Alfred L. Kronquest, in an application for U. S. Letters-Patent, filed July 18, 1939, Serial No. 285,137, has described an apparatus whereby cans or bottles intended to receive orange juice or any other sterile liquid, together with their closures, are so immersed in a bath of water that they are completely filled and all of the air thereby expelled, and while so filled are carried under a partition through a water seal, whereby all air is excluded, into a second compartment where they are emptied in an atmosphere of inert gas, and while in this atmosphere are conveyed under a filling head where they are filled with the sterile product, thence under a closing head where the sterile closure is firmly fixed in place to hermetically seal the package.

Any suitable apparatus can be employed in practicing my invention, but for the purpose of convenience the apparatus of the Kronquest patent application hereinbefore referred to has been shown. In this apparatus the sterilizing tank is indicated at 5. The containers and covers are introduced into the tank at 6 and are respectively moved over conveyor ways 7 and 8 into cooperative relation in the filling chamber 9 wherein the containers are filled with the sterile orange juice in the manner disclosed in the Kronquest application hereinbefore referred to. Following the filling of the containers, covers are secured thereon and the completed containers are delivered through the delivery throat 10 and can be packed without further processing.

A sterile, inert gas atmosphere is provided in the filling chamber 9 and this is maintained by suitable liquid seals. One such seal is provided by immersing the lower end of the delivery throat 10 in a wash bath 11 effective to wash off any juice or acid clinging to the external surface of the containers. The other seal is provided by the sterilizing bath forming the subject of this invention. This sterilizing bath is designated 12 and it forms the liquid seal by extending above the portion 13 of the container and cover transfer housing in the manner illustrated in the drawing.

The sterilizing bath 12 is heated to a temperature sufficient to cause rapid destruction of microbiological infection in or on the containers and covers and insufficient to injuriously affect any protective or decorative coating in or on said containers and covers. A heating means is indicated at 14. Suitable means is provided for moving the containers and covers rather slowly over the ways 7 and 8 so that each will remain in the sterilizing bath for an interval approximating two minutes or less.

By providing a sterilizing bath 12 comprising an aqueous solution of citric acid containing approximately 2 grams of citric acid in each 100 cc. and having a pH of approximately 3.0, maintaining the solution at a temperature of about 180° F., and causing the containers and closures to pass through the solution at such a speed that they are completely immersed for approximately two minutes, I can deliver sterile containers and closures into the filling and closing compartment 9 of the apparatus referred to so that the filled and sealed container will require no further processing or pasteurization to protect the contents against microbiological spoilage for an indefinite period of time.

If the container is to be used for the packaging of any other fruit juice, I use an acid common to that juice to produce the correct acidity in the sterilizing bath. For tomato juice or other tomato products, or apple sauce or other apple products, I will use malic acid, for sauerkraut juice or beer, I will use lactic acid, and any chemist, being aware of the composition of the fruit juice, beverage, or food stuff to be packaged will be able to select the appropriate acid for the purpose. It will also be understood that in the event that the food or beverage contains a number of acids, one may use a mixture of the principal acids in approximately the ratio in which they occur without departing from the spirit of the invention.

While it is ordinarily necessary to expose a container of tin plate to steam under a pressure of fifteen pounds to the square inch for twenty minutes, or to dry air at a temperature of 240° F. for at least one hour, in order to sterilize it so that sterile orange juice or the like may be packaged therein, it is possible by using the novel sterilizing bath herein disclosed, and by practicing the method herein disclosed, to completely sterilize such a container by immersing the same and its closure for two minutes at a temperature of 180° F. in said bath comprising an aqueous solution of citric acid having a pH of approximately 3.0, containing approximately two grams of citric acid in each 100 cc. of solution.

Having thus described my invention, what I claim and desire to protect by Letters-Patent, is—

1. A method of sterilizing sheet metal containers for foods and beverages consisting in subjecting the container immediately prior to filling to an aqueous solution of an acid which is a constituent of and has a pH comparable to that of the food or beverage which is to be packed in the container and maintaining said solution at a temperature sufficient to cause destruction of microbiological infection and insufficient to injuriously affect the container or any protective or decorative coating thereon and retaining said solution in said container for a period of time sufficient to effect sterilization of the interior thereof.

2. A method of sterilizing sheet metal containers for foods and beverages consisting in immersing the container immediately prior to filling in an aqueous solution of an acid which is a constituent of the food or beverage to be packed in the container and which solution has a pH of from 2.0 to 5.0 and maintaining said a solution at a temperature of 165° to 190° F. and retaining the container in the solution for a period of time sufficient to effect sterilization.

3. A method of sterilizing sheet metal containers for the packaging of citrus juices consisting in immersing the container immediately prior to filling in an aqueous solution of citric acid, said solution having a pH of 3.0 or below, said solution being maintained at a temperature of 165° to 190° F. and retaining the container in the solution for a period sufficient to effect sterilization.

GEORGE D BEAL.